(12) United States Patent
Günther et al.

(10) Patent No.: US 6,351,220 B1
(45) Date of Patent: Feb. 26, 2002

(54) SECURITY MODULE FOR MONITORING SECURITY IN AN ELECTRONIC SYSTEM AND METHOD

(75) Inventors: Stephan Günther; Dirk Rosenau, both of Berlin (DE)

(73) Assignee: Francotyp-Postalia AG & Co., Birkenwerder (DE)

( * ) Notice: Subject to any disclaimer, the term of this patent is extended or adjusted under 35 U.S.C. 154(b) by 0 days.

(21) Appl. No.: 09/594,002

(22) Filed: Jun. 14, 2000

(30) Foreign Application Priority Data

Jun. 15, 1999 (DE) .......................... 199 28 061

(51) Int. Cl.⁷ .............................................. G08B 3/00
(52) U.S. Cl. .............................. 340/691.1; 340/815.45; 705/405
(58) Field of Search .................... 340/691.1, 693.1, 340/541, 508, 514, 636, 815.45, 687; 705/405, 401, 400, 30, 60; 713/200; 235/375; 380/2

(56) References Cited

U.S. PATENT DOCUMENTS

| | | | |
|---|---|---|---|
| 4,812,994 A | * 3/1989 | Taylor et al. | 705/410 |
| 5,027,397 A | * 6/1991 | Double et al. | 713/194 |
| 5,572,429 A | * 11/1996 | Hunter et al. | 705/404 |
| 5,671,146 A | * 9/1997 | Windel et al. | 705/410 |
| 5,748,638 A | 5/1998 | Gunther et al. | 714/719 |
| 5,946,672 A | * 8/1999 | Chrosny et al. | 705/410 |
| 6,023,690 A | * 2/2000 | Chrosny et al. | 705/405 |
| 6,044,364 A | * 3/2000 | DeFilippo et al. | 705/404 |

FOREIGN PATENT DOCUMENTS

| | | |
|---|---|---|
| DE | 43 15 732 | 6/1994 |
| DE | 195 34 530 | 3/1997 |
| DE | 299 05 219 | 7/1999 |

* cited by examiner

Primary Examiner—Thomas Mullen
(74) Attorney, Agent, or Firm—Schiff Hardin & Waite

(57) ABSTRACT

In a security module and method for monitoring security in an electronic system, a microprocessor that is interconnected to further function units is programmed for overlapping processing with validation of the system status occurring in the meantime, and drives an indicator for signaling the module status.

19 Claims, 6 Drawing Sheets

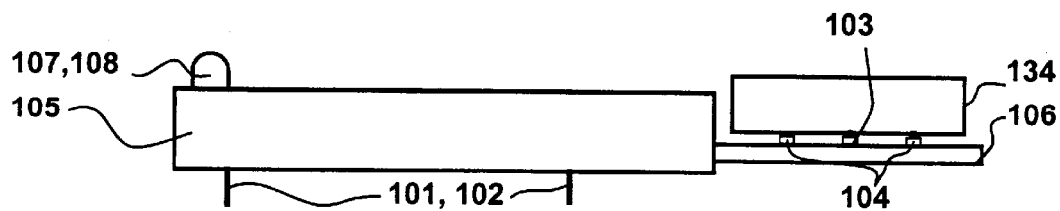

Fig. 3

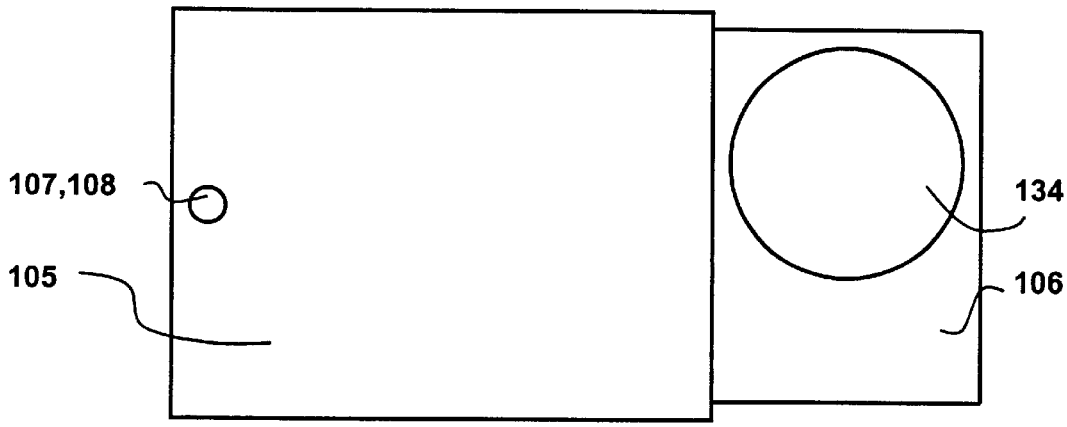

Fig. 4

| Status No. | LEDs | Lit | Blinking | out | display | Meaning |
|---|---|---|---|---|---|---|
| 220 | R |  |  | X | Green Lit | OK |
|  | G | X |  |  |  |  |
| 230 | R | X |  |  | Red Lit | Error from static test |
|  | G |  |  | X |  |  |
| 240 | R | X |  |  | Orange Lit | Error from dynamic test |
|  | G | X |  |  |  |  |
| 250 | R |  | X |  | Red Blinking | long time with-out contact with DC |
|  | G |  |  | X |  |  |
| 260 | R |  |  | X | Green Blinking | Key is not installed |
|  | G |  | X |  |  |  |
| 270 | R |  | X |  | Orange Blinking | Suspect |
|  | G |  | X |  |  |  |
| 280 | R | X |  |  | Red Lit Orange blinking | Temperature too high |
|  | G |  | X |  |  |  |
| 290 | R |  | X |  | orange blinking Green Lit | Battery replacement needed |
|  | G | X |  |  |  |  |

Fig. 5

SECURITY MODULE FOR MONITORING SECURITY IN AN ELECTRONIC SYSTEM AND METHOD

BACKGROUND OF THE INVENTION

1. Field of the Invention

The present invention is directed to a security module for monitoring security in an electronic system and to a method for monitoring the system security particularly suited for employment in a postage meter machine or mail processing machine or a computer with mail processing capability.

2. Description of the Prior Art

A large variety of protection measures are known for protecting against outages or disturbances as well as for offering 100% availability of intelligent electronic systems. For example, parallel computer systems are utilized for extremely high security demands (air traffic, etc.); stored results, for example, are more likely to be redundantly implemented for low level applications in order to create the possibility of recognizing a malfunction or an outage as well as, potentially, creating the possibility for correction. Often, the individual security measures are of very different natures (for example, combinations of hardware and software) and must be adapted to the respective security requirement (which may be needed for only a portion of a system), which leads to many dedicated, discrete solutions that cause high design costs, and under certain circumstances realization costs as well, due to their individual character.

European Application 417 447 discloses the use of special modules in electronic data processing systems which are equipped with means for protecting against an invasion into their electronics. Such modules are referred to as security modules below.

Modern postage meter machines or other devices for franking postal matter are equipped with a printer for printing the postal value stamp onto the postal matter, a controller for controlling the printing and the peripheral components of the postage meter machine, an accounting unit for debiting postage fees that are maintained in non-volatile memories, and a unit for the cryptographic protection of the postage fee data. A security module (European Application 789 333) can include a hardware accounting unit and/or a unit for securing the printing of the postage fee data. For example, the former can be realized as application specific integrated circuit (ASIC) and the latter can be realized as an OTP (one-time programmable) processor. The internal OTP-ROM stores sensitive data (cryptographic keys) secured against read out that are required, for example, for reloading a credit. An encapsulation with a security housing offers further protection.

Further measures for protecting a security module against an attack on the data stored therein are described in German Applications 198 16 572.2, and 198 16 571.4, as well as co-pending U.S. application Ser. No. 09/522,619 (filed Mar. 10, 2000) and Ser. No. 09/522,620 (filed Mar. 10, 2000) and Ser. No. 09/522,621 (filed Mar. 9, 2000), and German Utility Model application 299 05 219.2. A luggable security module can assume various states in its life cycle. A distinction can be made as to whether the security module is functioning or malfunctioning. It is assumed that the hardware circuitry of this module is adequately protected against tampering, so this is not separate monitored. Any software-controlled operation is only considered error-free only as long as the original programs, remain intact which must therefore be protected against manipulation.

SUMMARY OF THE INVENTION

An object of the present invention is to provide a high level of security for an electronic system by means of a security module and method. The method and security module should, with minimal outlay, enable a high level of security for definable areas and functions of a system and should be universally applicable, i.e. with only minimum adaptation outlay, to a large variety of different electronic systems. The method and security module should, for example, be employable in postage meter machines, for which there are special security demands with respect to the postal register data since, in particular, the monetary accounting data must be incapable of being manipulated.

This object is achieved in a method and module for ensuring security of an electronic system is assured wherein the integrity of the system is repeatedly checked over time. A modular structure of the security method provides a two-stage, overlapping testing that fundamentally distinguishes between static and dynamic conditions of the system. The data, functions and patterns that are non-volatilely stored in memory areas are suitable for representing a system status. Pre-determined sub-areas of the memory can be allocated to specific data processing units, and the data stored therein create a "snapshot" that is characteristic of the status of the system at that time. Predetermined sub-areas of the memory can be allocated to specific status representations that are reached in chronological succession.

The validation of a system status given dynamic changes in accordance with the invention is based on the overlapping processing of data from at least parts of the test patterns, function scope or memory area employed, individually or in combination with one another. The overlapping processing includes a mutual transposition of the data supplied from a specific data processing unit and the data supplied by another specific data processing unit, and further includes implementing a redundant security function on the transposed data by the two data processing units. The results of the redundant data processing must be comparable for a system to be determined as tamper-free and error-free.

A security module for a data processing system, for example for a postage meter machine, performs the function of, for example, accounting for the postage fees, and/or cryptographic protection. The security module has a module processor and a hardware accounting unit. The security module is inventively characterized by its own indicator that, with direct drive by the module processor of the security module, allows identification of the current condition of the security module. The signaling of the module condition is activated only when the security module is supplied with system voltage, in order to preserve the battery. The processor also can monitor or check the operation of the hardware accounting unit. The availability of the system is not paramount but rather the dependable recognition of malfunctions or outages as well as a suitable reaction thereto, as is particularly for events which are security-sensitive but somewhat uncritical as to time.

DESCRIPTION OF THE DRAWINGS

FIG. 3 is a side view of the inventive security module.

FIG. 4 is a plan view of the inventive security module.

FIG. 5 is a table illustrating status signaling made by the security module.

DESCRIPTION OF THE PREFERRED EMBODIMENTS

Figure 1:
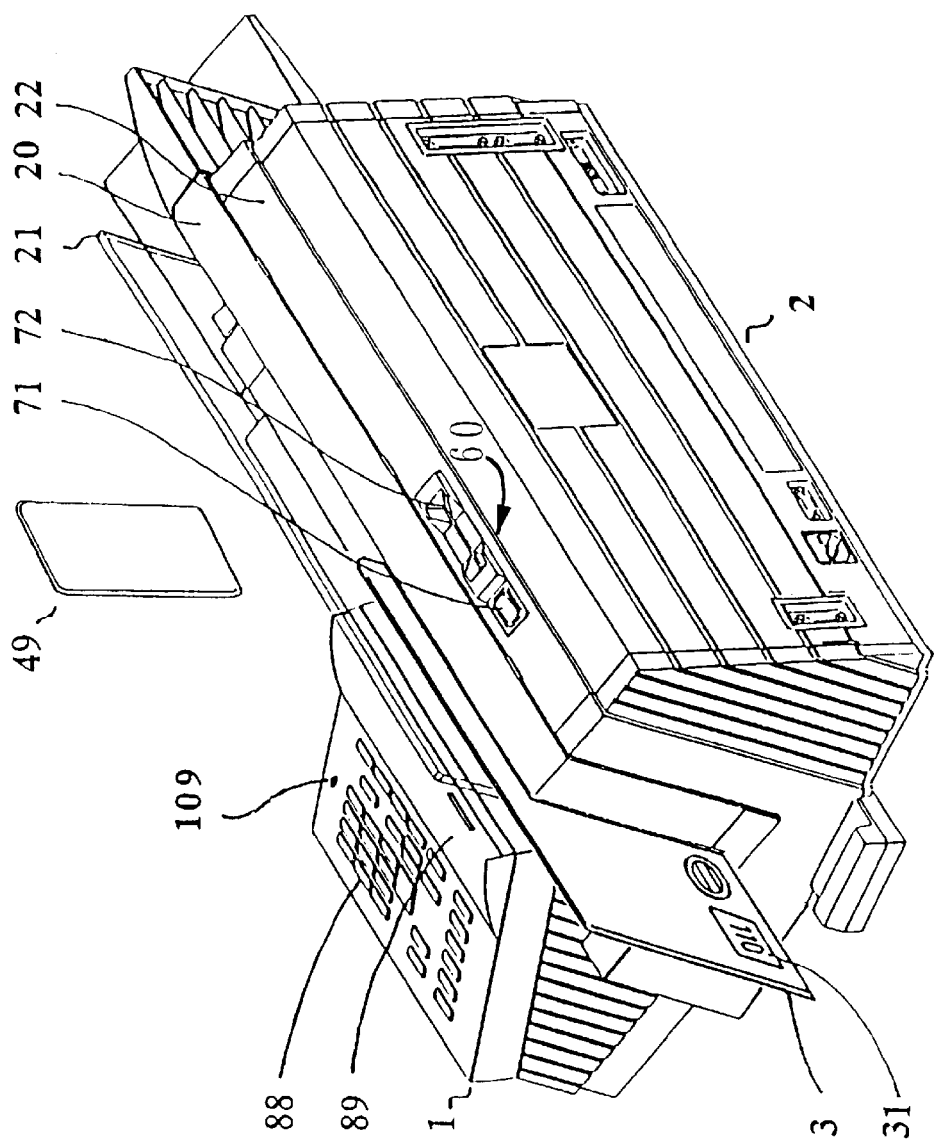
FIG. 1 is a perspective view of a postage meter machine from the back, in which an inventive security module can be used and which can operate in accordance with the inventive method.

FIG. 1 shows a perspective view of a postage meter machine from the back. The postage meter machine is composed of a meter 1 and a base 2. The latter is equipped with a chip card write/read unit 60 that is arranged behind a guide plate 20 and that is accessible from the upper side 22 of the housing. After the postage meter machine is turned on by a switch 71, a chip card 49 can be inserted in the slot 72 of the write/read unit 60. A supplied letter 3 standing on edge, which has its side to be printed lying against the guide plate 20, is then printed with a franking stamp 31 according to the input data. The letter feed opening is laterally limited by a transparent plate 21 and the guide plate 20.

The security module is plugged onto the motherboard of the meter 1 of the postage meter machine or of some other suitable device. It is preferably accommodated within the meter housing, which is fashioned as a security housing. The meter housing is designed such that the user can see the status display of the security module from the outside through an opening 109. The opening 109 proceeds to surface of the meter 1 at which a keyboard 88 and a display 89 are provided. The display 89 is directly controlled by the internal module processor of the security module and thus cannot be manipulated from the outside without difficulty. The display 89 is always active in the operating condition, so that the application of the system voltage Us+to the module processor of the security module suffices to activate the display 89 in order to be able to read the module status.

Figure 2:
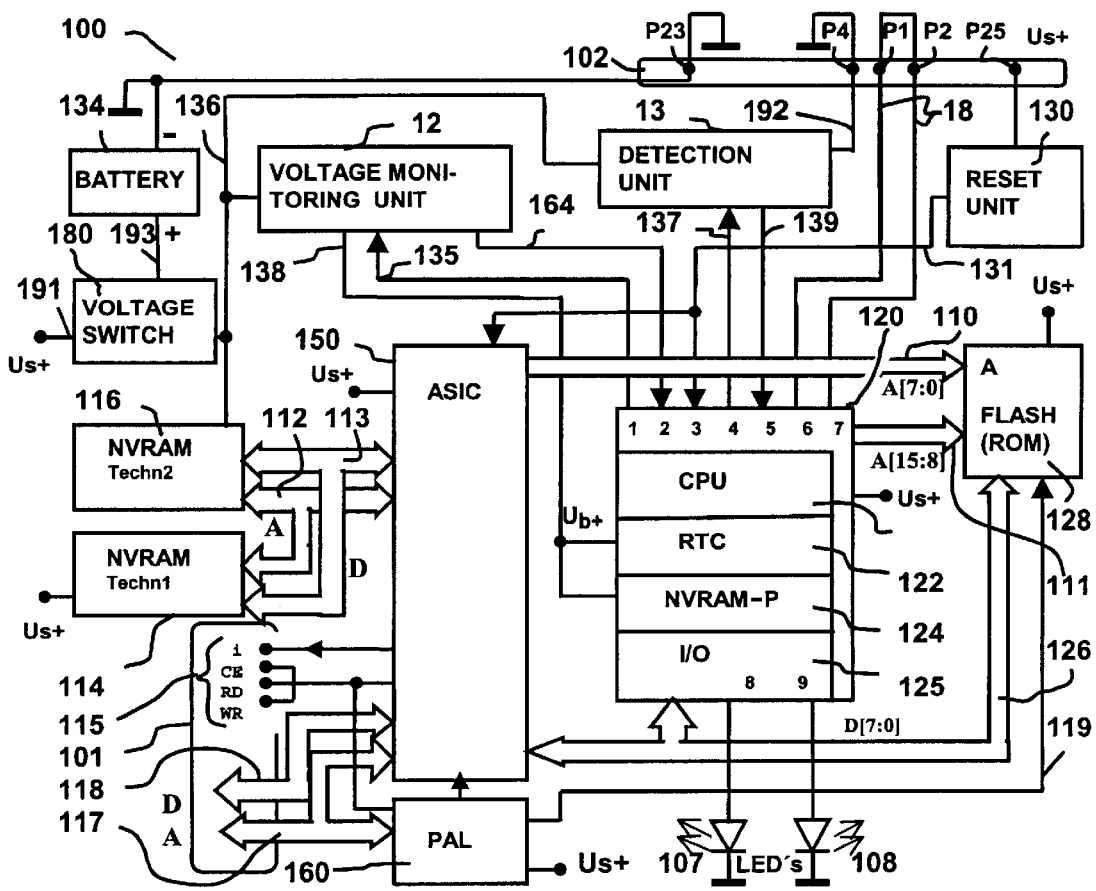
FIG. 2 is a block diagram of the inventive security module.

FIG. 2 shows a block diagram of the postal security module PSM 100 in a preferred version. The negative pole of the battery 134 is applied to ground and to a pin P23 of the contact group 102. The positive pole of the battery 134 is connected via the line 193 to one input of a voltage switchover 180, and the line 191 carrying system voltage is connected to the other input of the voltage switchover 180. The type SL-389/P is suitable as battery 134 for a service life of up to 3.5 years or the type SL-386/P is suitable for a service life up to 6 years given a maximum power consumption by the PSM 100. A commercially obtainable circuit of the type ADM 8693ARN can be utilized as the voltage switchover 180. The output of the voltage switchover 180 is supplied via the line 136 to a voltage monitoring unit 12 and a detection unit 13. The voltage monitoring unit 12 and the detection unit 13 have a communication connection to the pins 1, 2, 4 and 5 of the module processor 120 via the lines 135, 164 and 137, 139. The output of the voltage switchover 180 is also supplied via the line 136 to the supply input of a first memory 116, for example a static read-only memory that, due to the battery 134, serves as a non-volatile memory NVRAM of a first technology. The security module PSM is in communication with the postage meter machine via the system bus 115, 117,118. Via the system bus and a modem (not shown), the module processor 120 can enter into a communication connection with a remote data center. The accounting is accomplished by the application-specific circuit ASIC 150.

System voltage is also supplied to the supply input of the second non-volatile memory NVRAM 114. This is thereby a non-volatile memory NVRAM of a second technology (shadow-RAM). This second technology preferably is a RAM and an EEPROM, whereby the latter automatically accepts the data contents given an outage of the system voltage. The first NVRAM 116 and the second NVRAM 114 are correspondingly fashioned in order to store the postal accounting data in non-volatile memories of different technologies. The NVRAM 114 of the second technology is connected to the corresponding address and data inputs of the circuit ASIC 150 via an internal address and data buses 112, 113.

The ASIC 150 contains at least one hardware accounting unit for the calculation of the postal data to be stored. An access logic for the ASIC 150 is accommodated in the programmable array logic (PAL) 160. Address and control buses 117,115 of the motherboard of the meter 1 are connected to corresponding pins of the logic PAL 160, and the PAL 160 generates at least one control signal for the ASIC 150 and a control signal 119 for the program memory FLASH 128. The module processor 120 processes a program that is stored in the FLASH 128. The module processor 120 and the other assemblies such as FLASH 128, ASIC 150 and PAL 160 are connected to one another via an internal module system bus that contains lines 110, 111, 126,119 for data, address and control signals.

The reset unit 130 is connected via the line 131 to the pin 3 of the module processor 120 and to a pin of the ASIC 150. The module processor 120 and the ASIC are reset by a reset signal generated in a reset unit 130 when the supply voltage drops.

The module processor 120 internally has a processing unit CPU 121, a real-time clock 122, a RAM unit (designated $NVRAM_{13}$ P) and an input/output unit 125. The module processor 120 of the security module 100 is connected via an internal module data bus 126 to a FLASH 128 and to the ASIC 150. The FLASH 128 serves as a program memory and is supplied with system voltage Us+. For example, it can be a 128 Kbyte FLASH memory of the type AM29F010-45EC. The ASIC 150 of the postal security module 100 supplies the addresses 0 through 7 to the corresponding address inputs of the FLASH via an internal module address bus 110. The module processor 120 of the security module 100 supplies the addresses 8 through 15 to the corresponding address inputs of the FLASH 128 via an internal address bus 111. The ASIC 150 of the security module 100 has a communication connection with the data bus 118, the address bus 117 and the control bus 115 of the motherboard of the meter 1 via the contact group 101 of the interface.

As an output voltage on the line 136 for the voltage monitoring unit 12 and memory 116, the voltage switchover 180 supplies that of its input voltages that is higher than the other. Due to the possibility of automatically feeding the described circuit with the higher of the two voltages dependent on the amplitudes of the voltages Us+ and Ub+, the battery 134 can be replaced during normal operation without data loss. The real-time clock 122 and the memory 124 are supplied with an operating voltage via the line 138. This voltage is supplied by the voltage monitoring unit 12.

In the idle times outside normal operation, the battery 134 of the postage meter machine supplies the real-time clock 122 having date/time-of-day registers and/or the memory 124, which contains security-relevant data, in the aforementioned way. If the voltage of the battery 134 drops below a certain limit during battery operation, then the circuit 12 connects the feed point for the real-time clock 122 and the memory 124 to ground. Thus the voltage at the real-time clock 122 and at the memory 124 then lies at 0 V. This causes the memory 124, which, for example, contains important cryptographic keys, to be very quickly erased. At the same time, the registers of the real-time clock 122 are also erased and the current time of day and the current date are lost. This action prevents a possible tamperer from stopping the internal real-time clock 122 of the postage meter machine by manipulating the battery voltage without security-relevant data being lost. A tamperer thus is prevented from evading other time-based security measures such as, for example, the sleep mode (as described in European Application 660 268) or long time watchdog (explained below with reference to FIG. 5).

The circuit of the voltage monitoring unit 12 is, for example, dimensioned such that any drop of the battery voltage on the line 136 below the specific threshold of 2.6 V leads to the response of the voltage monitoring unit 12. Simultaneously with the indication of the under-voltage of the battery, the voltage monitoring unit 12 switches into a self-holding state, in which it remains even when the voltage is subsequently increased. The circuit 12 also supplies a status signal. The next time the module is turned on, the module processor 120 can interrogate the status of the circuit (status signal) and can conclude that the battery voltage fell below a specific value in the interim in this way and/or by interpretation of the contents of the erased memory 124. The module processor 120 can reset the monitoring unit 12, i.e. "arm" it. The latter reacts to a control signal on the line 135.

The line 136 at the input of the voltage monitoring unit 12 simultaneously supplies the detection unit 13 with operating or battery voltage. The status of the detection unit 13 is interrogated by the processor 120 via the line 139 or the detection unit 13 is triggered, or set, by the module processor 120 via the line 137. After the setting, a static test for connection is carried out. To that end, ground potential is interrogated via a line 192, this ground potential being present at the terminal P4 of the interface of the postal security module PSM 100 and only being capable of being interrogated when the security module 100 is properly plugged in. When the security module 100 is plugged in, ground potential of the negative pole 104 of the battery 134 of the postal security module PSM 100 is applied to the terminal P23 of the contact group 102 of the interface and thus can be interrogated by the detection unit 13 at the terminal P4 of the interface via the line 192.

Lines that form a conductor loop 18 only, for example, when the security module 100 is plugged into the motherboard of the meter 1, are connected to the pins 6 and 7 of the module processor 120. For dynamically testing as to whether the postal security module PSM 100 is connected to the motherboard of the meter 1, the module processor 120 applies changing signal levels to the pins 6, 7 at very irregular intervals and these are fed back via the loop.

The module processor 120 is equipped with an input/output unit 125 whose pins 8, 9 serve to emit at least one signal for signaling the status of the security module 100.

I/O ports of the input/output unit 125 to which internal module indicators, for example colored light-emitting diodes (LED) 107, 108, are connected lie at the pins 8 and 9. The indicator may alternatively be an audio indicator. If LEDs are used, these signal the module status through the opening 109 in the meter housing when a security module 100 is plugged onto the motherboard of the meter 1. The security module can assume various statuses in its life cycle.

Thus, for example, whether the security module contains valid cryptographic keys must be detected. Further, it is also important to distinguish whether the security module is functioning or malfunctioning. The exact nature and number of module statuses is dependent on the realized functions in the security module and on their implementation.

FIG. 3 shows the mechanical structure of the security module in a side view. The security module is fashioned as a multi-chip module, i.e. a number of function units are interconnected on a printed circuit board 106. The security module 100 is potted with a hard casting compound 105, and the battery 134 of the security module 100 is replaceably arranged on the printed circuit board 106 outside the casting compound. For example, it is potted with a casting material 105 so that the LEDs 107, 108 project from the casting material at a first location and such that the printed circuit board 106 with the plugged battery 134 projects laterally from a second location. The printed circuit board 106 also has battery contact posts 103 and 104 for the connection of the poles of the battery 134, preferably on the equipping side above the printed circuit board 106. The contact groups 101 and 102 are arranged under the printed circuit board 106 (interconnect side) of the security module 100 for plugging the postal security module 100 onto the motherboard of the meter 1. In a way that is not shown, the application circuit ASIC 150 has a communication connection with the system bus of a control unit 1 via the first contact group, and the second contact group 102 serves for supplying the security module 100 with system voltage. When the security module is plugged onto the motherboard, then it is preferably arranged within the meter housing that the LEDs 107, 108 are close to the opening 109 or project into it. The meter housing thus is designed such that the user can see the status display of the security module from the outside. The two LEDs 107 and 108 are controlled via two output signals of the I/O ports at the pins 8, 9 of the module processor 120. Both light-emitting diodes 107 and 108 are accommodated in a common component housing (such as a bi-color light-emitting diode), for which reason the dimensions or the diameter of the opening 109 can be relatively small, on the order of magnitude of the LEDs. Three different colors (red, green, orange) can be fundamentally displayed dependent on whether the light-emitting diodes 107 and 108 are driven individually or simultaneously. For distinguishing between statuses, the light-emitting diodes 107 and 108 are also driven to blink individually or together, possibly in alternation, so that nine different statuses can be distinguished wherein at least one of the two LEDs 107 and 108 is activated.

FIG. 4 shows a plan view of the postal security module. The casting compound 105 forms a block surrounding a first part of the printed circuit board 106, whereas a second part of the printed circuit board 106 remains free of casting compound for the replaceably arranged battery 134. Here, the battery contact posts are covered by the battery.

A number of possible status displays proceed according to a self-explanatory table for status signaling shown in FIG. 5 The LED 107 emitting green indicates an OK status but a red emitting LED 108 indicates an error status 230 as a result of at least one static self-test. The result of such a known self-test cannot be falsified, due to the direct signaling via the LEDs 107 and 108.

If, for example, the keys stored in the security module were lost in the interim, the ongoing check in the dynamic mode would detect the error and indicate this as the status 240 with the LEDs 107, 108 emitting orange. Booting is required after an on/off operation since no other operation can otherwise be implemented. If the installation of a key was omitted during manufacture, this is indicated as status 260, for example with the LED 107 flashing green. If a long time watchdog timer has timed out, this is signaled as status 250 with the LED 108 flashing red. The long time watchdog timer times out when the data center has not been contacted for a long time, for example in order to reload a credit. The status 250 is likewise reached if the security module was separated from the meter 1. Further status displays for the statuses 270, 280, 290 are optionally provided for various further tests.

Figure 6:
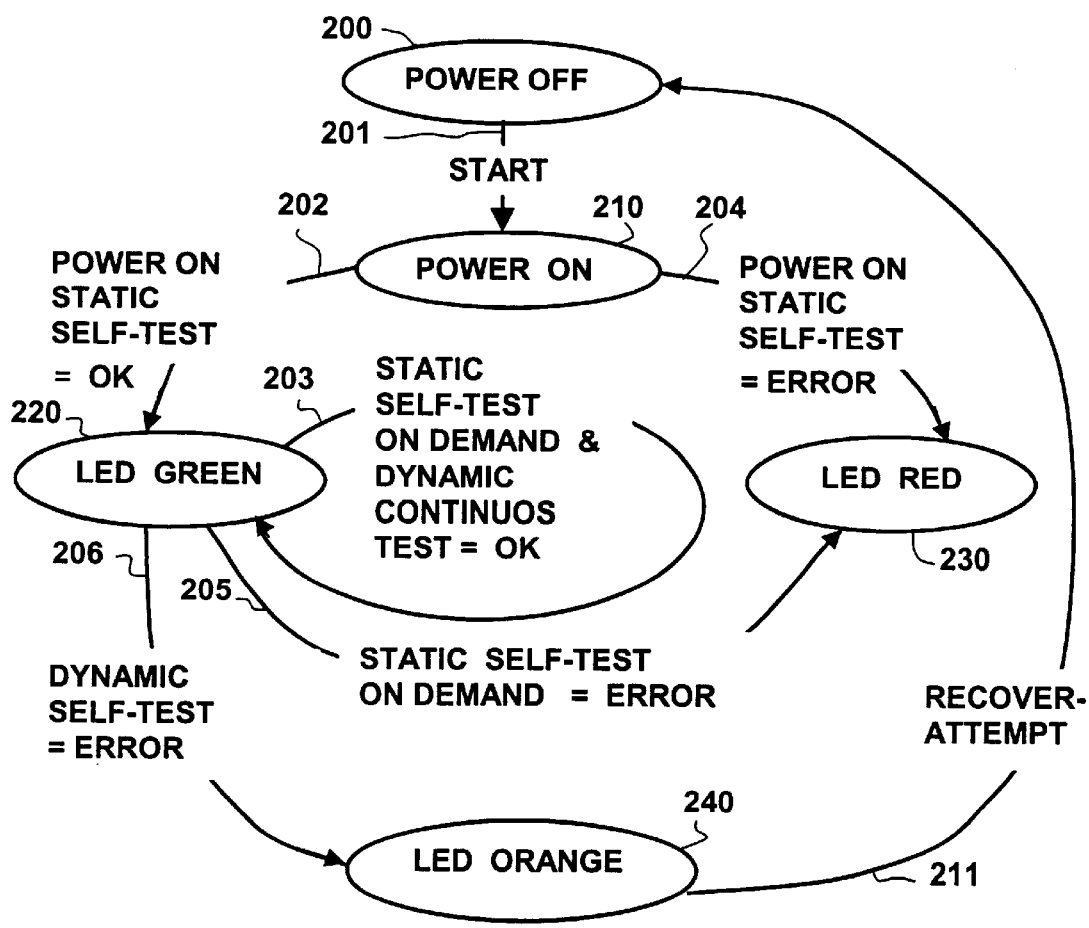
FIG. 6 is a flowchart illustrating static and dynamic testing which are undertaken by the security module in accordance with the invention.

FIG. 6 shows an illustration of the tests in the system for statically and dynamically changeable conditions. A system that has been turned off in the status 200 proceeds—after being turned on—via the transition Start 201 into the status 210 in which the security module implements a static self-test as soon as the operating voltage is present. The status 220 (LED 107 emitting green) is reached in the transition 202 wherein the self-test yields an OK given a proper result. Proceeding from this latter status, a repeated static self-test and a dynamic test can be implemented as needed. Such a transition 203 or 206 leads either back to the status 220 LED green given OK or to the status 240 LED orange given an error. The latter can be eliminated by a recover attempt, possibly by shutting off (transition 211) and re-activating the device (transition 201). Static errors, however, cannot be eliminated. From the status 210 wherein the activated device implements a static self-test, there is a transition 204 to the status 230 (LED 108 emitting red) given an error. At any time when the device is in the status 220 (LED 107 emitting green), a static self-test implemented on demand can lead via a transition 205 to the status 230 (LED 108 emitting red) given an error. Proceeding from the status 220 (LED 107 emitting green), further transitions (not shown) lead to the further statuses 270 (signaled with LEDs flashing orange), 280 (signaled with LEDs emitting red/flashing orange), and 290 (signaled with LEDs emitting green/flashing orange).

Figure 7:
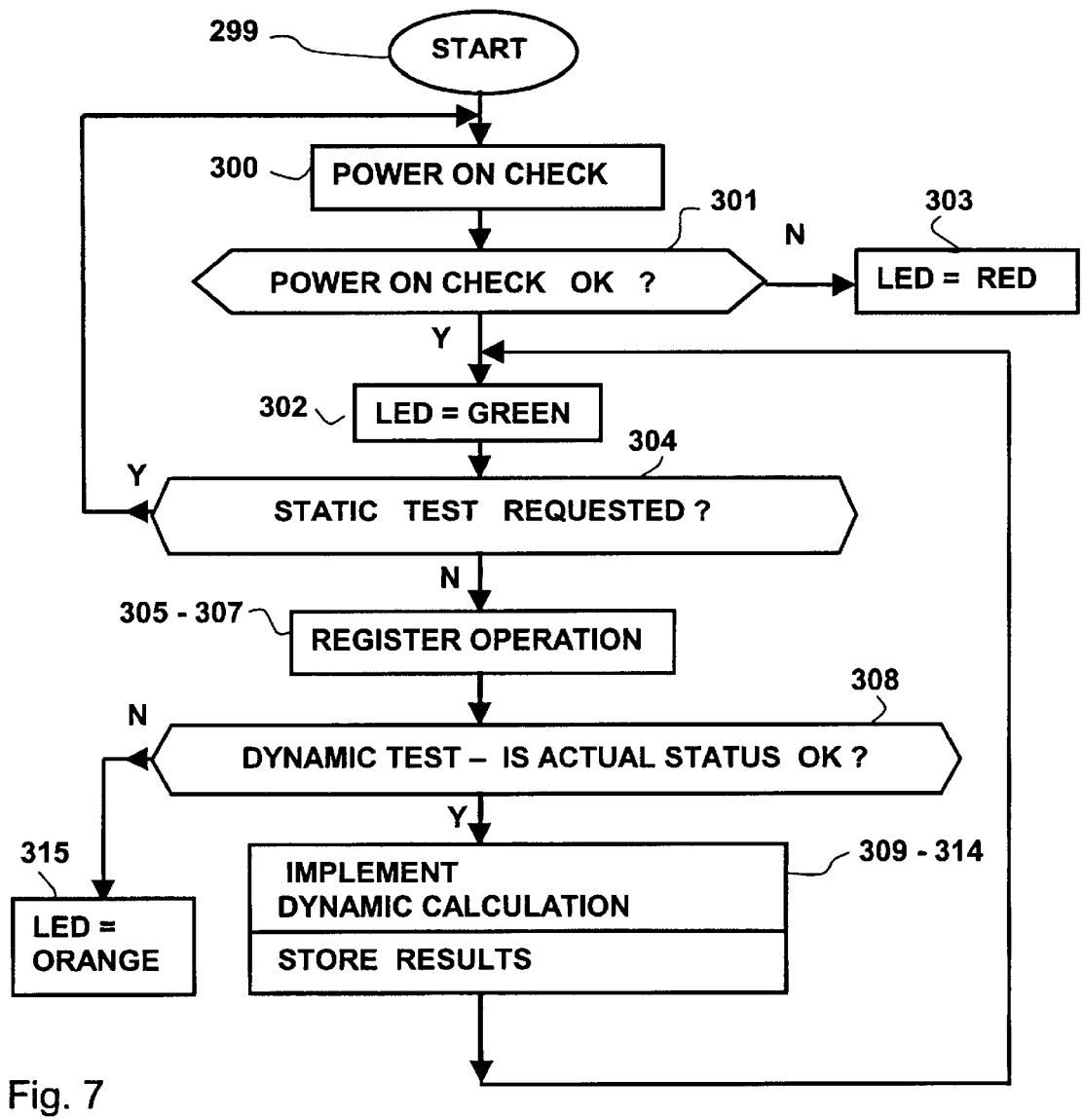
FIG. 7 is a flowchart illustrating testing of the integrity system which is undertaken in accordance with the invention.

The tests that sequence in the system before the franking are now explained in greater detail on the basis of the flowchart shown in FIG. 7. As a result of a program stored in the FLASH 128, the microprocessor CPU 121 is programmed to implement such said self-tests, whereby, following the start 299, a power-on self-test is implemented in a first step 300, and a query is then made in step 301 as to whether the power-on self-test yielded an OK. When this is the case, then the microprocessor CPU 121 turns the green LED 107 on via an I/O port 125 in step 302. Otherwise the microprocessor CPU 121 turns the red LED 108 on via an I/O port 125 in step 303.

From step 302, a branch is made to the query 304 wherein a check is made as to whether a further static test is requested. If this is the case, a branch is made back to the step 300. Otherwise, at least one register operation is implemented in the steps 305–307 and a branch is then made to the query 308 wherein a check is made to determine whether the actual status is valid or proper. A dynamic test is implemented during the course of the register operation or subsequently. If this does not proceed properly or is affected by an error, then a branch is made from the query step 308 to the step 315 and both the green LED 107 and the red LED 108, are illuminated by the microprocessor CPU 121 via an I/O port 125. The overall impression thus arises that the LEDs are emitting orange. Following the query step 308 given a satisfactory actual status, a dynamic calculation is implemented in the steps 309–314, followed by storage of the results. From the last step, a branch is made back to the step 302. A two-stage test thereby occurs on demand. For the testing with the microprocessor CPU 121, it is adequate for the dynamic calculation when only sub-functions are replicated in a time-offset manner on the same or on another computing path. Of course, both computing paths must lead to the same test result, i.e., OK or DEFECT or ERROR.

In a system having the memory area M and a number of functions F, a security-relevant sub-area M' and F' that can be defined in size or scope should be protected against malfunctions and outages. To this end, the security-relevant functions F'—insofar as they do not already operate exclusively on the memory area M'—are fashioned such that they represent unambiguous test references (patterns) of their (successful) functioning in the system in the memory area M'. The security procedure fundamentally distinguishes between two different system statuses: the static, wherein the content of the of the memory area M' does not change, and the dynamic, wherein a modification of the memory area M' ensues. The security method is characterized in that, during the static condition, a check of the integrity of the system (of the system components M' and F' to be more precise) ensues in a chronologically re-occurring succession in that a "pattern" C2 of the memory area M' is generated by a mathematical one-way function (for example, a hash function) that is compared to the currently valid, stored pattern C1 (which was generated and validated for the first time during the system initialization). This has the advantage that a workable format for Cx is generated even given arbitrarily long sources M', and thus an efficient processing is enabled. If inequality of the patterns C2 and C1 occurs during the first, static system status, the previously defined and desired reaction is generated by the security method in response to a malfunction or an outage or a manipulation (tampering) of the system.

In the second, dynamic system stage, the memory content M' changes due to the operation of at least one of the functions F'. The security method inventively provides an overlapping processing with validation of the system status occurring in-between. To this end, the memory area M' is redundantly implemented and contains at least two datasets M1' and M2' that correspond to one another in nature and scope as well as—in the static condition—in terms of content, these being in the form of data that are stored in sub-memory areas $M_1'$ and $M_2'$. The security method undertakes the address administration of the sub-areas $M_1'$ and $M_2'$ through $M_x'$ of the area M' such that at least the most recently current and validated status—for example, M1'—is always available in the memory area $M_1'$. In order to validate a modified status—for example, M2'—in the memory area $M_2'$, a first possibility—particularly when an outside influencing of the system by third parties can be precluded—is to multiply implement the currently changing process from the function scope F'—for example, F1'—in order to accept the new status M2' as validated on the basis of "patterns" Cx formed in the meantime over the data in the area $M_2'$, as well as to make a comparison of the respectively intermediately stored pattern results, and to consequently enable the status M1' for overwriting by the following changes. Another possibility is for the security method to have its own intelligence available in order to implement at least some functions from F' and to thus generate a volatilely stored mirror image of M2' in a first step and to subsequently generate the appertaining mirror pattern Cx for the purpose of comparison to the "original".

Figure 8:
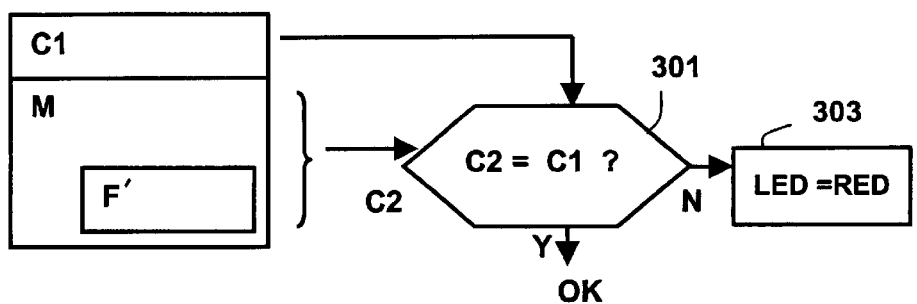
FIG. 8 is a schematic illustration of a static test undertaken in accordance with the invention.

The method shall be explained in detail with reference to an example shown in FIG. 8. A stored pattern C1 was initially generated during the system initialization and was validated. A pattern C2 of the memory area M' and of the functions F' is generated by a mathematical one-way function and is compared in step 301 to the currently valid, stored pattern C1. In the event of error, the microprocessor 120 drives the LED 108 to emit red (step 303).

Figure 9:
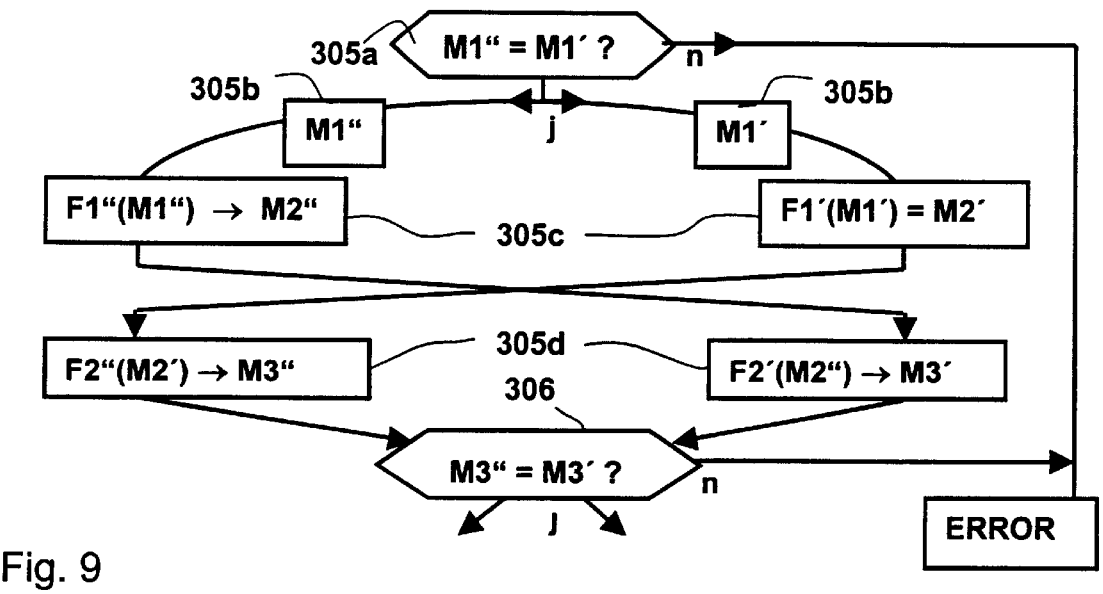
FIGS. 9 and 10 illustrate the overlapping and interleaved processing which takes place in accordance with the invention.

The dynamic self-test is explained with reference to FIG. 9, which shows an illustration of the overlapping processing. The steps 305 and 306 of the flowchart shown in FIG. 7 for testing the integrity of the system can sequence divided into substeps. The memory area M' is redundantly implemented as memory area M', whereby the two correspond to one another in nature and scope as well as—in the static condition—in terms of the data content, which is illustrated by sub-step 305*a*. Otherwise, there is an error, i.e. the datasets M1' and M1" do not correspond to one another. The two memory areas M1', M1" are separately processed from sub-step 305*a* via sub-step 305*b* in that a respective security function F1', F1" is implemented that modifies the data content, so that the datasets M2' and M2" arise in sub-steps 305*c*. By transposition of the datasets M2' and M2" and implementation of further security functions F2', F2" on the transposed datasets M2' and M2", an overlap in the form of the datasets M3" from F2"(M2') and M3' from F2'(M2") arises in the sub-steps 305*d*. The datasets M3' and M3" are compared in sub-step 306. An error exists if the datasets M3' and M3" do not correspond to one another. Fundamentally, a number of such sub-steps 305*x* with overlapping, security-relevant sub-memory areas can be implemented. Given dynamic changes of the system status, the microprocessor 120 is programmed to implement an overlapping processing of at least a part of the function scope employed and, as necessary, to implement the validation of the system status multiply in intermediate steps.

Figure 10:
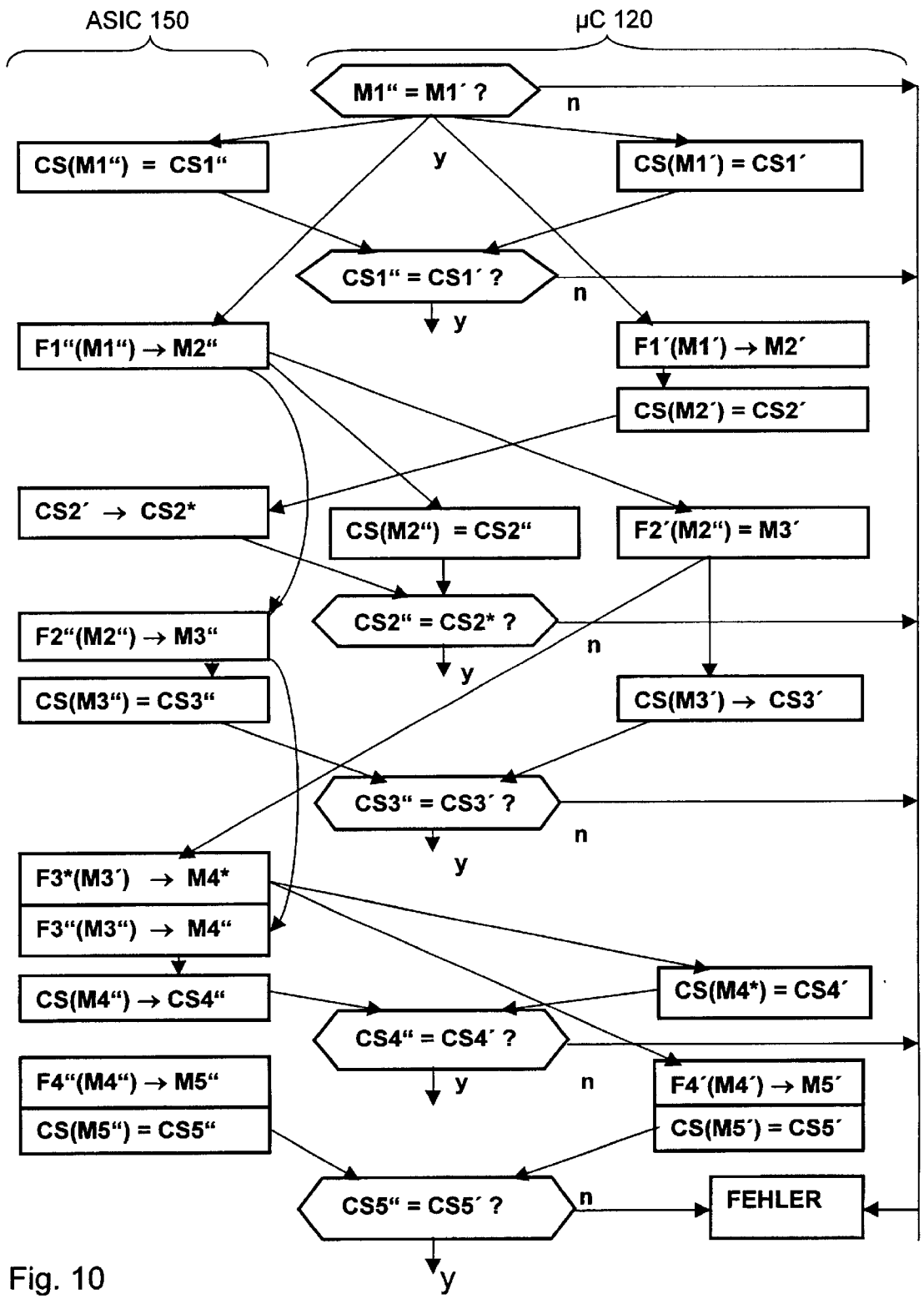

FIG. 10 shows an overlapping processing in combination with overlapping checksums and/or with overlapping operations. The dynamic self-test can be implemented in the greatest variety of variations in conformity with the security demands. The microprocessor 120 is programmed—given dynamic changes of the system status—to implement an overlapping processing of at least a part of the function scope employed or of the test pattern employed. The validation also subsequently ensues. The overlapping processing of at least parts of the test pattern employed employs the function scope or memory area in combination with one another for the subsequent validation.

It is clear that arbitrarily high security demands can be realized merely on the basis of the embodiment of the environment and nature of the security method, these allowing different embodiments based on the same fundamental idea. For example, it can be assured on the basis of correspondingly many sub-areas Mx' that the security method does not prove to be a performance bottleneck even given process passages that are temporarily very fast. In another embodiment modifications of sub-areas of $M_x'$, $M_x''$, $M_x'''$, . . . , $M_x^*$ can be implemented only after requesting a write permission from the security method. It is also advantageous that the already existing system processor is used for the implementation of the security method, which does not preclude, however, conducting the overall security method in an ASIC or realizing the security method in a separate, especially access-protected processor given particularly high security demands.

It is noteworthy that the disclosed method makes it possible to implement the validation without interruptions with respect to the system integrity of freely definable system areas and functions, without supplying conclusions about the existing database or the existing functionality of an electronic system.

Inventively, the security module is intended for use in postal devices, particularly for use in a postage meter machine. However, the security module can have some other format that, for example, allows it to be plugged onto the motherboard of a personal computer that, as a PC franker, drives a commercially obtainable printer.

Although modifications and changes may be suggested by those skilled in the art, it is the intention of the inventors to embody within the patent warranted hereon all changes and modifications as reasonably and properly come within the scope of their contribution to the art.

We claim as our invention:

1. A security module for monitoring security in an electronic system, comprising:

a plurality of components which define a system status, representable by status data, and being subject to dynamic changes;

a first data processing unit which produces first data;

a second data processing unit which produces second data;

a non-volatile memory connected to said first and second data processing units and having a first memory area for storing said first data and a second memory area for storing said second data;

one of said first and second data processing units, as a monitoring unit, monitoring security of the other of said first and second data processing units, as a monitored unit, and said first data processing unit being connected to at least one of said plurality of components to identify an occurrence of a dynamic change in said system status; and said first data processing unit, upon identifying said occurrence of a dynamic change in said system status, being programmed for overlapping processing with intervening validation of said system status, by causing said first data processing unit to operate on said second data with a security function to obtain a first result and said second data processing unit to operate on said first data with said security function to obtain a second result, said monitoring unit having access to said first and second results and determining that the security of the monitored unit is uncompromised as long as said first and second results are comparable to each other.

2. A security module as claimed in claim 1 wherein said first data processing unit is a microprocessor and wherein said second data processing unit is a hardware accounting unit and wherein said microprocessor is said monitoring unit.

3. A security module as claimed in claim 2 wherein said microprocessor is programmed for overlapping processing of at least a portion of said second data stored in said second area of said non-volatile memory.

4. A security module as claimed in claim 2 wherein said hardware accounting unit performs at least one function and wherein said microprocessor is programmed for overlapping processing of said function.

5. A security module as claimed in claim 2 wherein said hardware accounting unit produces a test pattern, and wherein said microprocessor is programmed for overlapping processing of said test pattern.

6. A security module as claimed in claim 2 wherein said hardware accounting unit performs a function, and produces a test pattern, and wherein said microprocessor is programmed for overlapping processing of at least one of said second data stored in said second area of said non-volatile memory, said function, said test pattern and combinations of said second data stored in said second area, said function and said test pattern.

7. A security module as claimed in claim 1 wherein said monitoring unit is programmed for multiply implementing validation of said status in intermediate steps.

8. A security module as claimed in claim 1 wherein said monitoring unit is programmed to repeatedly check a static system status, as said system status, with a static self-test.

9. A security module as claimed in claim 1 further comprising an indicator which emits a humanly perceptible signal identifying said system status, said indicator being operated by said monitoring unit to emit said signal dependent on said occurrence of said dynamic change in said system status.

10. A security module as claimed in claim 9 wherein at least said monitoring unit and said indicator are potted in a casting compound on a printed circuit board, said casting compound having an opening therein through which said indicator projects.

11. A security module as claimed in claim 9 wherein said indicator comprises at least one multi-colored light-emitting diode.

12. A method for monitoring security of an electronic system with a security module comprising the steps of:

conducting a two-stage testing of a system status with validation of said system status by means of a static test and a dynamic test of said system status;

in said dynamic test, conducting overlapping processing of data in two data processing units to obtain respective processing results; and validating said security of said system in said overlapping processing by comparing data in a predetermined memory area.

13. A method as claimed in claim 12 wherein said dynamic test includes overlapping processing of at least a part of said data in said memory area.

14. A method as claimed in claim 12 wherein said dynamic test includes overlapping processing of at least a portion of a function scope of one of said processing units.

15. A method as claimed in claim 12 wherein said dynamic test includes overlapping processing of a test pattern represented in by said data.

16. A method as claimed in claim 12 wherein said dynamic test includes overlapping processing of at least a portion of said data, a test pattern representing said data, and a function scope of one of said processing units, and combinations of said data, said test pattern and said function scope.

17. A method as claimed in claim 12 comprising validating said system status repeatedly in intermediate steps.

18. A method as claimed in claim 12 comprising signaling said system status as a result of said two-stage testing with a humanly perceptible signal.

19. A method as claimed in claim 18 comprising selectively illuminating at least one light-emitting diode to produce said humanly perceptible signal.

* * * * *